United States Patent
Kondo et al.

[11] Patent Number: 5,474,508
[45] Date of Patent: Dec. 12, 1995

[54] CONTROL SYSTEM FOR AUTOMATIC TRANSMISSION

[75] Inventors: Jiro Kondo; Masao Inoue; Yoji Watanabe; Takashi Suzuki; Takayuki Sakai, all of Hiroshima, Japan

[73] Assignee: Mazda Motor Corporation, Hiroshima, Japan

[21] Appl. No.: 88,030

[22] Filed: Jul. 9, 1993

[30] Foreign Application Priority Data

Jul. 10, 1992 [JP] Japan ................. 4-183948
Jul. 10, 1992 [JP] Japan ................. 4-183960

[51] Int. Cl.$^6$ ........................... F16H 61/06
[52] U.S. Cl. ................. 477/143; 477/121; 477/148
[58] Field of Search .................. 477/118, 143, 477/144, 148, 174, 121; 364/424.1

[56] References Cited

U.S. PATENT DOCUMENTS

| | | | |
|---|---|---|---|
| 4,881,627 | 11/1989 | Ishii | 477/174 X |
| 4,996,893 | 3/1991 | Nakamura et al. | |
| 5,016,495 | 5/1991 | Takizawa | |
| 5,054,336 | 10/1991 | Takizawa | |
| 5,097,725 | 3/1992 | Sawa | 74/866 |
| 5,203,235 | 4/1993 | Iizuka | 477/118 X |

FOREIGN PATENT DOCUMENTS

| | | | |
|---|---|---|---|
| 38083 | 10/1981 | European Pat. Off. | 477/118 |
| 0350018 | 1/1990 | European Pat. Off. | |
| 0438643 | 7/1991 | European Pat. Off. | |
| 3922040 | 1/1991 | Germany | |
| 2-38747 | 2/1990 | Japan | |

OTHER PUBLICATIONS

Thermodynamics—3rd Edition, Kenneth Wark (pp. 538–539).

Primary Examiner—Charles A. Marmor
Assistant Examiner—Peter Kwon
Attorney, Agent, or Firm—Keck, Mahin & Cate

[57] ABSTRACT

A control system for an automatic transmission includes a shift gear mechanism for shifting respective shift gear stages, a shift line map including upshift lines and downshift lines, and a device for detecting a shift timing at which an shift operation should be carried out based on an engine load on the shift line map and a possibility is estimated that a driving condition will return back to the previous shift gear stage. The system also includes an engine load detecting device for detecting a stable condition of the engine load, and a controller for controlling the shift gear mechanism based on the shift line map after the engine load detecting device detects the stable condition of the engine load at the shift timing detected by the shift timing detecting device.

12 Claims, 8 Drawing Sheets

CONTROL SYSTEM FOR AUTOMATIC TRANSMISSION

BACKGROUND OF THE INVENTION

1. Field of the Invention

The present invention relates to a control system for an automatic transmission and, in particular, to a control system for an automatic transmission which works as an engine brake effectively by holding a lower shift gear stage.

2. Description of Related Art

Japanese Laid-Open Publication Patent No. 2-38747 discloses a control system for an automatic transmission which can work as an engine brake effectively by holding lower shift gear stage thereof when a driver requires a reduced vehicle speed. Namely, in this conventional control system, a 3–4 upshift line is extended to 75 km/h where the throttle valve opening is near zero, for example, as shown in a shift line map in FIG. 2. Further, when the driver closes the throttle valve opening at the third shift gear stage in order to reduce a vehicle speed as shown by a symbol β in FIG. 2, and then the driving condition goes across the 3–4 upshift line, the upshift operation to the fourth shift gear stage is delayed for a predetermined time. Thereafter, when the driving condition goes into the extended zone of the lower shift gear stage before the predetermined has passed, the upshift operation to the fourth shift gear stage is prohibited and the third shift gear stage is held so that the engine brake works effectively.

Figure 2:
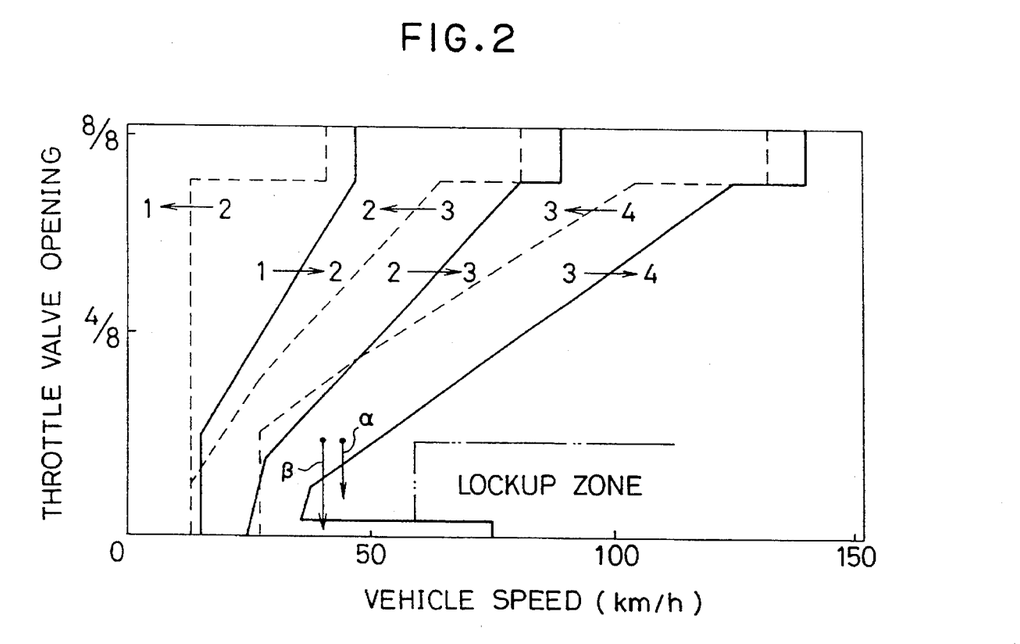
FIG. 2 is a shift line map in accordance with the present invention.

However, in the conventional control system for the automatic transmission, when the throttle valve opening is closed a little and the opening needs to be held as shown by a symbol α in FIG. 2, the upshift operation to the fourth shift gear stage is not carried out immediately after the driving condition goes across the 3–4 upshift line and, then, the upshift operation is delayed for the predetermined time. As a result, the driver feels uncomfortableness in the upshift operation of the automatic transmission.

On the other hand, in the conventional control system for the automatic transmission, when the throttle valve opening is fully closed, the engine brake works effectively by holding the lower shift gear stage. Thereafter, when the driver operates an accelerator pedal, the holding of the third shift gear stage is released. However, if the driving condition goes across the 3–4 upshift line from the extended zone of the third shift gear stage, the upshift operation to the fourth shift gear stage is carried out immediately after the driver operates the accelerator pedal. As a result, the driver feels uncomfortably under this situation.

SUMMARY OF THE INVENTION

It is therefore an object of the present invention to provide a control system for an automatic transmission which does not make a driver feel uncomfortableness of the shift operation.

It is another object of the present invention to provide a control system for an automatic transmission which works an engine brake effectively when the throttle valve opening is closed and thereafter the driving condition goes across a predetermined upshift line.

It is still another object of the present invention to provide a control system for an automatic transmission which can work an engine brake effectively when the throttle valve opening is rapidly closed when the vehicle is running at the higher shift gear stage.

It is yet another object of the present invention to provide a control system for an automatic transmission which work an engine brake when the throttle valve opening is fully closed and the driver operates a brake pedal.

It is still another object of the present invention to provide a control system for an automatic transmission which does not make a driver feel uncomfortableness when holding of the lower shift gear stage is released.

These and other objects are achieved, according to the present invention, by providing a control system for an automatic transmission comprising shift means for shifting respective shift gear stages, a shift line map including upshift lines and downshift lines, means for detecting a shift timing at which a shift operation should be carried out based on an engine load on the shift line map and a possibility is estimated that a driving condition will return back to the previous shift gear stage, engine load detecting means for detecting a stable condition of the engine load, and control means for controlling the shift means based on the shift line map after the engine load detecting means detects the stable condition of the engine load at the shift timing detected by the shift timing detecting means.

Preferably, the engine load detecting means detects the stable condition of the engine load by employing a pseudo engine load signal which is changed when a difference between a actual engine load signal and an slow rate engine load signal, made based on the actual engine load signal, becomes less than a predetermined value. The control means controls the shift means based on the pseudo engine load signal.

Preferably, the shift line map is provided with a zone extended to a higher vehicle speed side in a lower shift gear stage near no engine load, and said shift timing detecting means detects the shift timing when the driving condition goes across the extended zone based on a change of the engine load.

In a feature of the present invention, the control means controls the shift means so that the lower shift gear stage is held when a no load signal of the engine is input thereto.

In another feature of the present invention, the shift line map includes divided driving zones different from the upshift and downshift lines, and the control system further comprises means for detecting when a driving condition moves from the extended zone of the lower shift gear stage to another zone except the extended zone on the shift line map, and second control means for switching a shift operation based on the upshift and downshift lines to a shift operation based on the driving zones and holding the lower shift gear stage when the driving condition is detected by the driving condition detecting means.

The above and other objects and features of the present invention will be apparent from the following description and by taking reference with accompanying drawings employed for preferred embodiments of the present invention.

DESCRIPTION OF THE PREFERRED EMBODIMENTS

The present invention will now be explained with reference to the preferred embodiments and the drawings.

Figure 1:
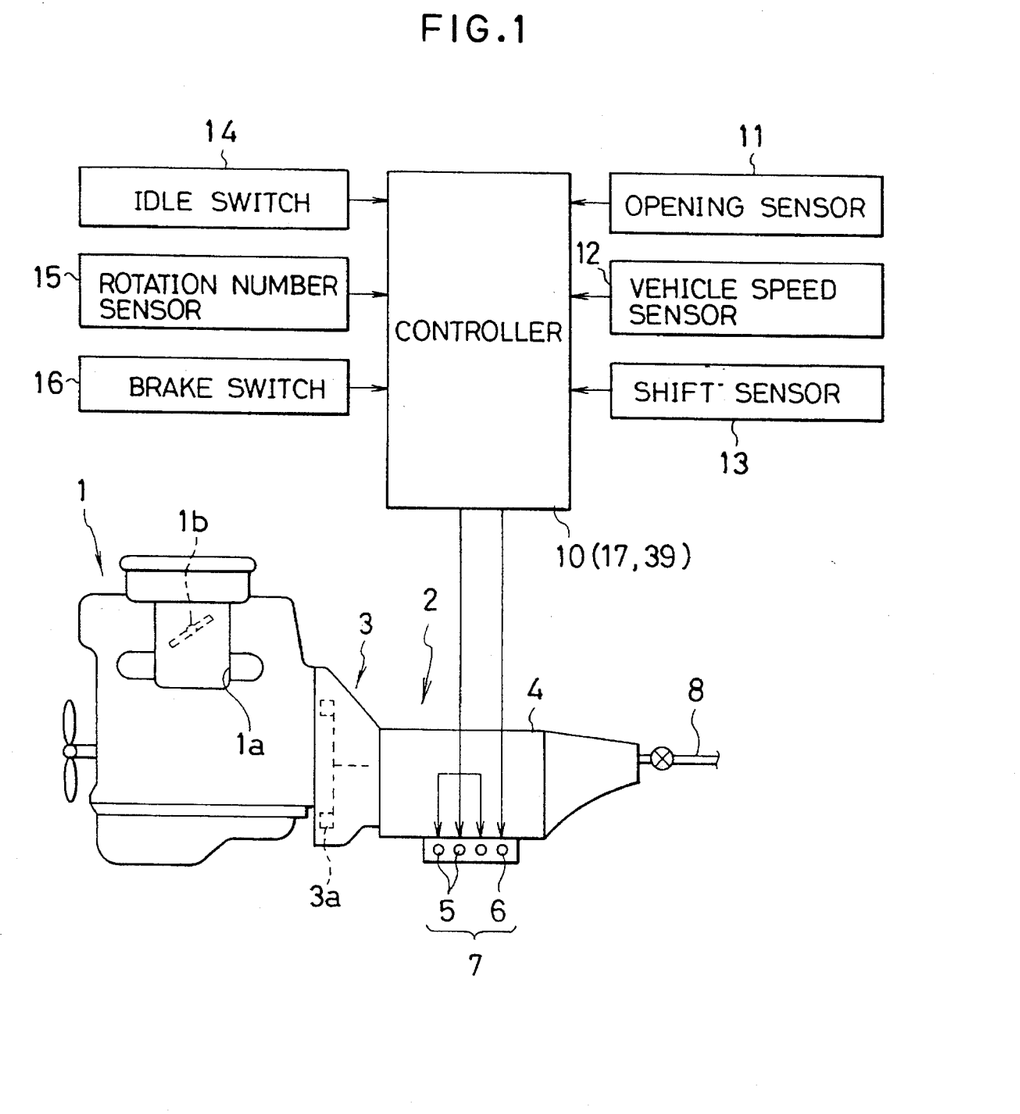
FIG. 1 is a schematic view of an automatic transmission to which a control system in accordance with the present invention can be applied.

FIG. 1 is a schematic view of an engine, an automatic transmission, a controller and the like of a motor vehicle. Referring to FIG. 1, there is provided an engine 1 which includes an intake passage 1a and a throttle valve 1b for adjusting an intake air amount. In the rear side of the engine 1 there is disposed an automatic transmission 2 which includes a torque converter 3 with a lockup clutch 3a and a shift gear mechanism 4 for establishing four shift gear stages in the forward direction and one speed stage in the reverse direction. The automatic transmission 2 further includes a shift means 7 which consists of three solenoid valves 5 for shift control operation and a solenoid valve 6 for control operation of the lockup clutch engaging force. To the rear side of the shift gear mechanism 4 is connected a propeller shaft 8 through which an engine power is transmitted to right and left driven wheels.

There is further provided a controller 10 which includes a throttle opening sensor 11 for detecting an opening of the throttle valve 1b of the engine 1, a vehicle speed sensor 12 for detecting a vehicle speed, a shift gear stage sensor 13 for detecting a shift gear stage selected in the automatic transmission 2, an idle switch 14 which detects a fully closed condition of the throttle valve 1b and thereafter is turned on, an engine speed sensor 15 for detecting an engine rotation number, and a brake switch 16 which detects a brake operation by the driver and thereafter is turned on. Signals from those sensors 11–17 are input to the controller 10 which carries out a shift operation of the automatic transmission and a lockup control of the lockup clutch 3a of the converter 3 by controlling the solenoid valves 5 and 6.

FIG. 2 is a graphical representation showing a shift line map. Referring to FIG. 2, the shift line map is stored in advance in the controller 10. In the shift map, there is shown a vehicle speed, a throttle opening, respective upshift lines for 1–2, 2–3 and 3–4 shifts shown by solid lines, and respective downshift lines for 3–4, 2–3 and 1–2 showed by dashed lines. In the 3–4 upshift line, the lower shift gear stage extends to the vehicle speed of 75 km/h at the engine no load region or the region where the throttle opening is almost zero. As a result, as shown by symbol β in FIG. 2, when the throttle is closed fully at the lower shift gear stage and then the driving condition moves to the above mentioned extended lower shift gear stage, the shift gear stage is held at the third shift gear stage so that the engine brake is operated effectively. This operation is hereinafter called an automatic engine braking function.

Figure 3:
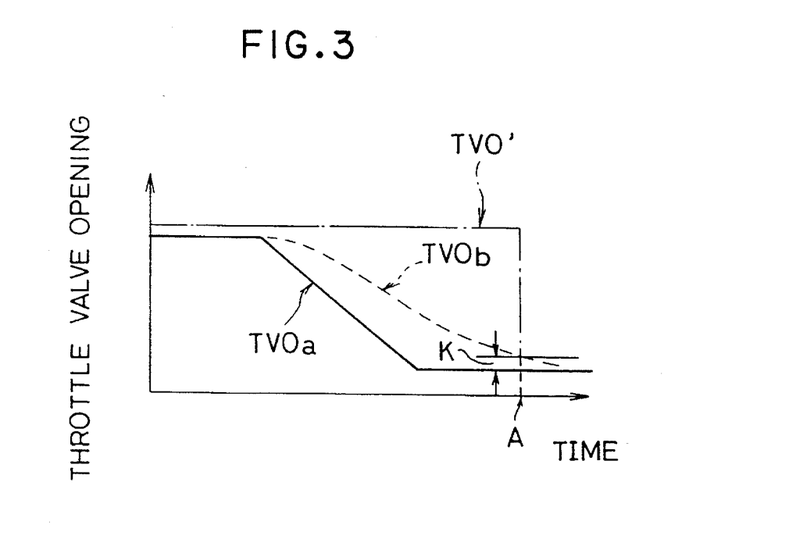
FIG. 3 is a graphical representation showing a pseudo throttle valve opening signal.

Referring to FIG. 3, the controller 10 generates a slow rate throttle valve opening signal TVOb (shown by a dashed line) which is prepared so as to be slower than an actual throttle valve opening signal TVOa (shown by a solid line) sent from the throttle valve opening sensor 11. The controller 10 further generates a pseudo throttle opening signal TVO' (shown by a chain line) which is updated at a time (shown by A) when a difference between the signal TVOa and the signal TVOb becomes less than a predetermined value (shown by k) after the actual throttle valve opening signal TVOa starts to change. That is, when the stable condition of the engine load is detected, the throttle opening is updated by the pseudo throttle valve opening signal TVO'. Therefore, the controller 10 also works as a load stable condition detecting means 17. The load stable condition detecting means 17 may detect the load stable condition by employing a rate of the throttle valve opening.

Figure 4:
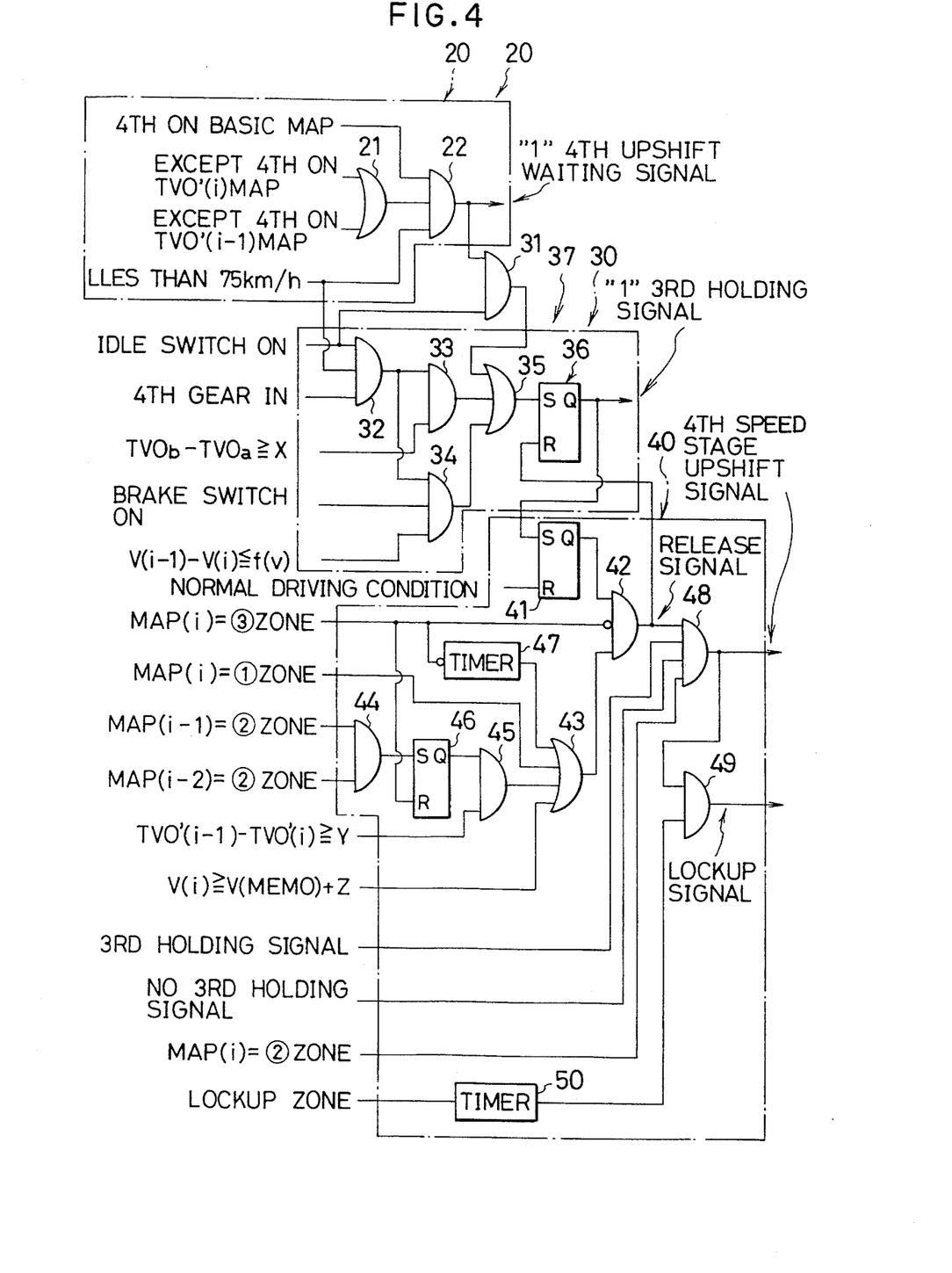
FIG. 4 is a shift control circuit in accordance with an embodiment of the present invention.

FIG. 4 shows a shift control circuit in accordance with the present invention.

Referring to FIG. 4, the controller 10 includes a shift control circuit which has a 3–4 upshift waiting circuit 20, an automatic engine brake circuit 30 and a release circuit 40 for the automatic engine brake.

The 3–4 upshift waiting circuit 20 is provided with an OR gate 21 and an AND gate 22. The OR gate 21 outputs "1" when either one of the pseudo throttle valve openings TVO'(i) nat the present time and TVO'(i-1) at the previous time locates in a zone except the fourth shift gear stage in the forward direction in the shift line map shown in FIG. 2. The AND gate 22 outputs "1" or outputs a signal for delaying an upshift operation to the fourth shift gear stage, when the vehicle is running in the speed zone of less than 75 km/h where the automatic engine braking function is required, the shift gear stage locates in the fourth shift gear stage in the shift line map based on the actual throttle valve opening TVOa, and the AND gate 22 receives the output signal "1" from the OR gate 21. In other conditions the AND gate 22 outputs "0" or does not output the signal for delaying the upshift operation to fourth shift gear stage. The AND gate 22 is controlled to release the output "1" after a predetermined time has passed.

Thus, the 3–4 upshift waiting circuit 20 works as a shift timing detection means 23. That is, the shift timing detection means 23 detects an upshift timing to the fourth shift gear going across the 3–4 upshift line in FIG. 2 according to the changes of the throttle valve opening, and then estimates that there is a possibility that the upshift timing moves into the extended region of the 3–4 upshift line based on the fully closed operation of the throttle valve.

The automatic engine brake circuit 30 is provided with first, second, third and fourth AND gates 31–34, an OR gate 35 and a holding circuit or flip-flop circuit 36. The first AND gate 31 outputs "1" when receiving the upshift waiting signal or the output "1" from the AND gate 22 and a signal representing an ON signal of the idle switch 14. The second AND gate 32 outputs "1" when receiving a signal representing the ON signal of the idle switch 14 at the time of the fourth shift gear stage being selected under the condition that the vehicle is running in the speed zone of less than 75 km/h required the automatic engine braking function, namely when the basic conditions of the automatic engine braking function are established. The third AND gate 33 outputs "1" when the difference between the slow rate throttle valve opening signal TVOb and the actual throttle valve opening signal TVOa is greater than a predetermined value X (TVOb−TVOa=X) and the second AND gate 32 outputs "1", namely when the throttle valve opening is rapidly changed to the closing direction. Further, the fourth AND gate 34 outputs "1" when the second AND gate 32 outputs "1", the brake switch 16 is turned on, and a difference between the vehicle speed V(i−1) at the previous time and the vehicle speed V(i) at the present time is less than a predetermined value f(V) which is a function of the vehicle speed. Moreover, the OR gate 35 receives the output "1" from the first, third or fourth AND gate 31, 33 or 34, and the holding circuit 36 receives the output "1" from the OR gate 35 at the S terminal and output "1" or a third shift gear stage holding signal at the Q terminal.

Thus, when the 3–4 upshift waiting circuit 20 detects the 3–4 upshift timing going across the 3–4 upshift line according to the actual throttle valve opening by employing the OR gate 21 and the automatic engine braking circuit 30, the waiting circuit 20 stops the output "1" (the output of the signal for delaying the upshift operation to the fourth shift stage) from the AND gate 22 and outputs "0" after the pseudo engine load signal TVO' of the load stable condition detecting means 17 is changed, namely the engine stable condition is detected. Thereafter, the solenoid valves 5, 6 are controlled so as to shift the shift gear stages based on the shift line map in FIG. 2. Concurrently, when the vehicle is running at the fourth shift gear stage in the speed zone of less than 75km/h and the throttle valve opening is fully closed, and the closing rate of the throttle valve (the difference between TVOb and TVOa) is equal to or greater than the predetermined value X, or the driver operates the brake pedal under the condition that the negative accelerating speed (V(i−1)−V(i)) is equal to or less than the predetermined value f(V), the holding circuit 36 outputs the third shift gear stage holding signal (output "1"). Therefore, the automatic engine braking circuit 30 works as a control means 37.

The release determining circuit 40 for the automatic engine brake has a function of determining the release of the holding the third shift gear stage controlled by the automatic engine braking circuit 30. The release is determined based on driving zones which are divided by the throttle valve opening and the vehicle speed as shown in FIG. 5.

Figure 5:
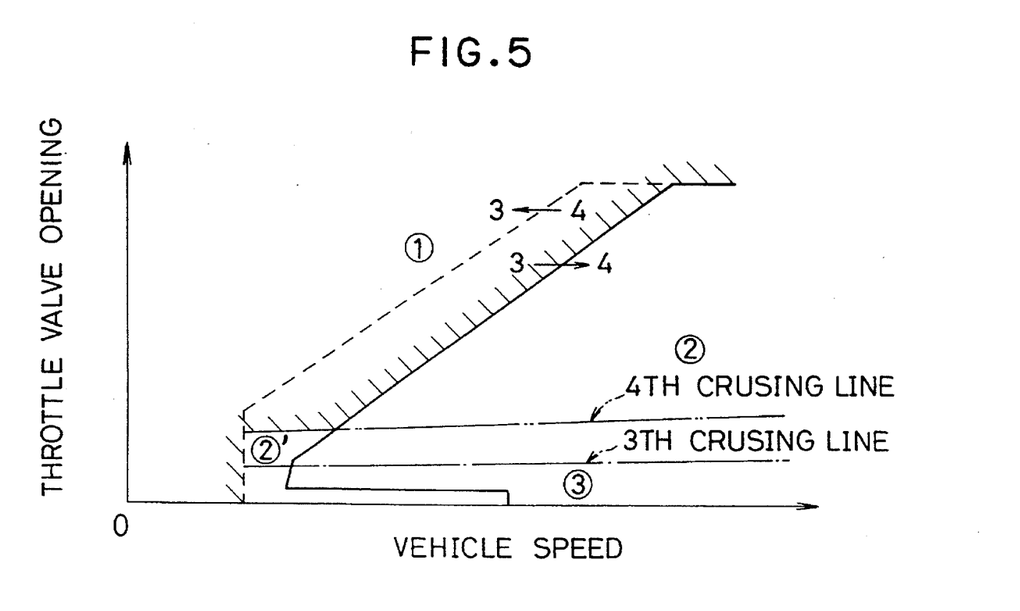
FIG. 5 is a graphical representation showing divided driving zones for releasing an automatic engine brake.

Referring to FIG. 5, a 3rd zone indicated by the numeral 3 is a driving zone where the driving condition goes across the extended region of the 3–4 upshift line and the vehicle can cruise at a constant speed at the third shift gear stage. Namely, the 3rd driving zone locates on the zone whose vehicle speed is less than a third shift gear stage cruising speed line indicated by a chain line corresponding a first predetermined engine load.

A 2nd zone indicated by the numeral 2 is a driving zone where the driving condition goes across the 3–4 upshift line and is greater than the first predetermined engine load. The 2nd zone includes a zone indicated by the numeral 2' which is a driving zone enclosed by a fourth shift gear stage cruising speed line indicated by a chain double-dashed line corresponding to a second predetermined engine load, the third speed stage cruising speed line, the 3–4 upshift line and the 4–3 downshift line.

A 1st zone indicated by the numeral 1 and slanting lines is a driving zone including two driving zones. One driving zone is a zone whose engine load is greater than the fourth shift gear stage cruising speed line or the second predetermined engine load and whose vehicle speed is less than the 3–4 upshift line. Another driving zone is a zone whose vehicle speed is less than the 4–3 downshift line.

The controller 10 also works as a driving condition detecting means 39 which detects that the driving condition moves from the 3rd zone to the zones except the 3rd zone, based on the respective outputs of the throttle valve opening sensor 11 and the vehicle speed sensor 12.

Referring back to FIG. 4, the release determining circuit 40 also works as a second control means which switches the shift operation based on the shift line map in FIG. 2 to the shift operation based on the divided driving zones in FIG. 5 when the controller 10 detects that the driving condition moves from the 3rd driving zone to the driving zones except the 3rd driving zone.

The release determining circuit 40 includes a flip-flop circuit or holding circuit 41 and a first AND gate 42. The holding circuit 41 holds the third speed stage holding signal from the automatic engine braking circuit 30. The first AND gate 42 generates a release signal for releasing the third shift gear stage holding signal only when receiving the third shift gear stage holding signal from the holding circuit 41. To the first AND gate 42, input is an inverting signal of the output representing that the present driving condition is in the 3rd zone. As a result, the AND gate 42 prohibits the output of the release signal when the driving condition is in the 3rd zone.

The release determining circuit 40 for the automatic engine brake further includes an OR gate 43, second and third AND gates 44, 45 and a holding circuit 46. The OR gate 43 has input the signal representing that the present driving condition is in the 1st driving zone, and outputs the signal to the first AND gate 42 so that the AND gate 42 can output the release signal. The second AND gate 44 outputs "1" when both of the driving condition at the previous time and the driving condition at two times before are in the 1st driving zone in FIG. 5. The holding circuit 46 holds the output of the second AND gate 44. The third AND gate 45 outputs "1" when it receives the output "1" of the holding circuit 46 and a difference between the pseudo throttle valve openings previous time and at the two times before (TVO'(i−2)(TVO'(i−1)−) is equal to or greater than a predetermined small value Y near zero. The latter condition means that the vehicle speed is reduced a little in order to move into a stable driving condition after the driver operates an accelerator pedal. The first AND gate 42 receives the output "1" through the OR gate 43 so as to be able to generate the release signal.

The OR gate 43 receives an inverting signal of an output representing that the present driving condition is in the 3rd driving zone in FIG. 5 through a timer 47 after a predetermined time, and receives an output representing that the present vehicle speed V(i) is equal to or greater than a total value of a vehicle speed value V(MEMO) stored at a time of the driving condition going out from the 3rd driving zone and a predetermined small value Z (V(MEMO)+Z). Thus, the OR gate 43 generates the release signal when the driving condition goes outside from the 3rd driving zone and the predetermined time has passed or the vehicle speed has increased.

The release determining circuit 40 further includes a fourth AND gate 48 which outputs "1" or a fourth shift gear stage upshift signal when receiving the release signal from the first AND gate 42, an output representing that there is a third shift gear stage holding signal at the previous time, an output representing that there is no third speed stage holding signal at the present time, and an output representing that the present driving condition is in the 2nd driving zone in FIG. 5. Namely, the release determining circuit 40 outputs "0" or holds the third shift gear stage when the driving condition is in the 3rd and 1st driving zones in FIG. 5 while the release signal is being output. On the other hand, the circuit 40 outputs "1" or the fourth speed stage upshift signal when the driving condition is in the 2nd driving zone in FIG. 5 while the release signal is being output.

The release determining circuit 40 still further includes a fifth AND gate 49 which outputs "1" or a lockup signal when receiving an output from a timer 50 delaying a predetermined time, an output which represents the present driving condition is in a lockup zone in FIG. 2, and the output "1" or the fourth shift gear stage upshift signal from the fourth AND gate 48. Namely, the fifth AND gate 49 outputs the lockup signal after the upshift operation to the fourth shift gear stage is carried out and the predetermined time has passed. As a result, the lockup clutch 3a is engaged by the operation of the solenoid valve 6.

Next, there will be described embodiments of the present invention in respective driving conditions.

Figure 6:
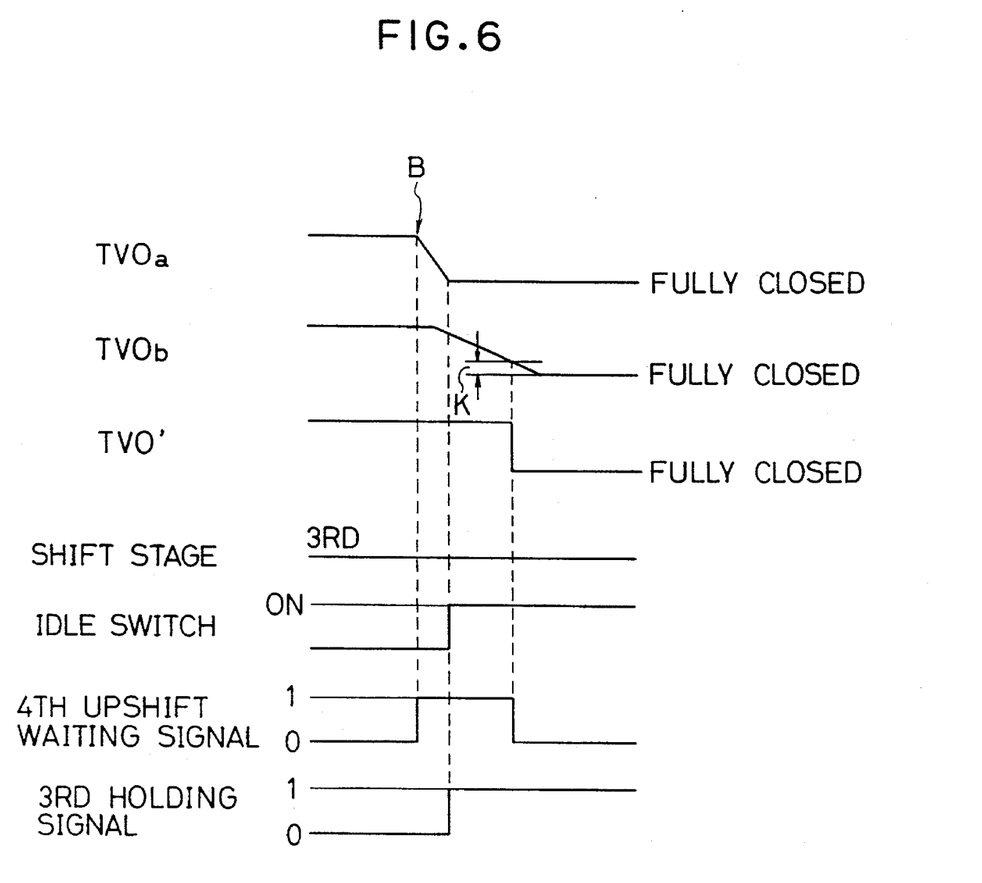
FIG. 6 is a time chart showing a shift operation when the throttle valve opening is fully closed.

Referring to FIG. 6, in accordance with an embodiment of the present invention, when the throttle valve opening is fully closed by a driver where the vehicle speed is less than 75 km/h and the shift gear stage is in the third shift gear stage as shown by the symbol β in FIG. 2, the AND gate 22 of the 3–4 upshift waiting circuit 20 outputs "1" or the fourth shift gear stage upshift holding signal at a time of B when the actual throttle valve opening TVOa goes across the 3–4 upshift line, by which the upshift operation to the fourth shift gear stage is forced to wait or be held. Thereafter, when the idle switch is turned on by the actual throttle valve opening TV0a being fully closed, the first AND gate 31 of the automatic engine brake circuit 30 outputs "1" and the Q terminal of the holding circuit 36 outputs "1" or the third shift gear stage holding signal so that the automatic transmission 2 holds the third shift gear stage without upshifting operation to the fourth shift gear stage. As a result, the engine brake is operated and the vehicle speed is reduced effectively. On the other hand, when the difference between the actual throttle valve opening TVOa and the slow rate throttle valve opening TVOb becomes less than the predetermined value k, the OR gate 21 of the 3–4 upshift waiting circuit 20 outputs "0" and then the AND gate 22 stops to output the fourth shift gear stage upshift waiting signal. However, the fourth shift gear stage upshift waiting signal is held by the holding circuit 36 and therefore the upshift operation to the fourth shift gear stage is prevented.

Figure 7:
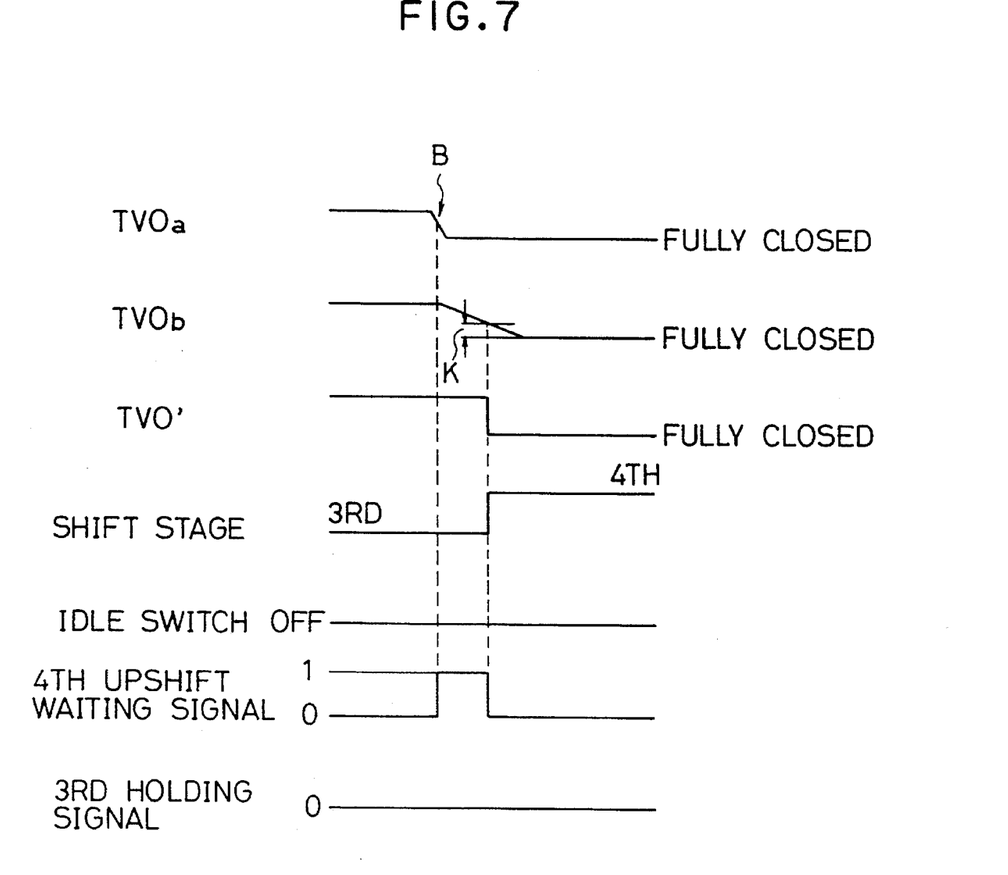
FIG. 7 is a time chart showing a shift operation when the throttle valve opening is closed a little.

Referring to FIG. 7, in accordance with another embodiment of the present invention, when the throttle valve opening is closed a little by a driver and the driving condition goes across the 3–4 upshift line as shown by the symbol α, the AND gate 22 of the 3–4 upshift waiting circuit 20 outputs "1" or the fourth shift gear stage upshift holding signal at a time of B. At this moment, since the idle switch is not turned on, the first AND gate 31 of the automatic engine brake circuit 30 does not output "1" and therefore the holding circuit 36 does not output the third shift gear stage holding signal. In this embodiment, when the difference between the actual throttle valve opening TVOa and the slow rate throttle valve opening TVOb becomes the predetermined value k, the fourth shift gear stage upshift waiting signal is stopped to be output and then the upshift operation to the fourth shift gear stage is carried out. Further, since the actual throttle valve opening TVOa is changed a little and therefore the difference between the actual throttle valve opening TVOa and the slow rate throttle valve opening TVOb becomes less than the predetermined value k in a short time, the output term of the fourth shift gear stage upshift waiting signal is relatively short. As a result, when the driver makes the throttle valve opening close a little, the upshift operation to the fourth shift gear stage is carried out in relatively short time and therefore the driver does not feel uncomfortableness.

Figure 8:
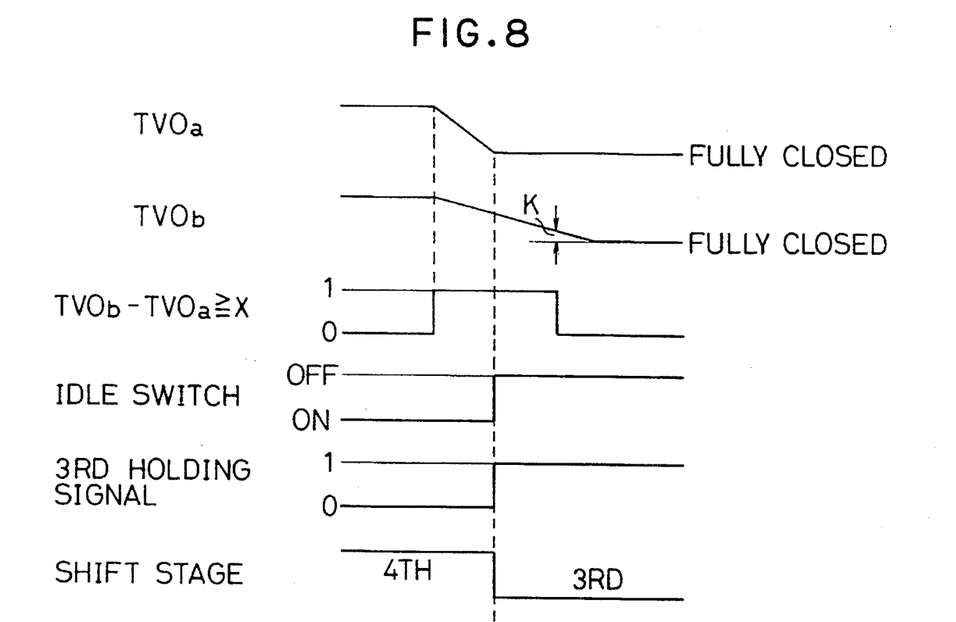
FIG. 8 is a time chart showing a shift operation when the throttle valve opening is rapidly closed.

Referring to FIG. 8, in accordance with another embodiment of the present invention, when the throttle valve opening is fully closed by a driver under the condition that the vehicle speed is less than 75 km/h and the vehicle is running at the fourth shift gear stage in the forward direction, the second AND gate 32 of the automatic engine braking circuit 30 outputs "1". In this embodiment of the present invention, when the difference between the actual throttle valve opening TVOa and the slow rate throttle valve opening TVOb becomes equal to or greater than the predetermined value X or the throttle valve opening is rapidly closed by the driver, the third AND gate 33 outputs "1" and then the Q terminal of the holding circuit 36 outputs "1" or the third shift gear stage holding signal so that the automatic transmission 2 is downshifted from the fourth shift gear stage to the third shift gear stage. That is, the downshift operation from the fourth shift gear stage to the third shift gear stage is carried out only when the driver requires the throttle valve opening to be rapidly closed in order to reduce the vehicle speed. As a result, the effective downshift control operation can be carried out when the driver wants to reduce the vehicle speed. Further, since the downshift operation is not carried out in all situations by the automatic engine braking function, the number of the shifting operations can be limited effectively.

Figure 9:
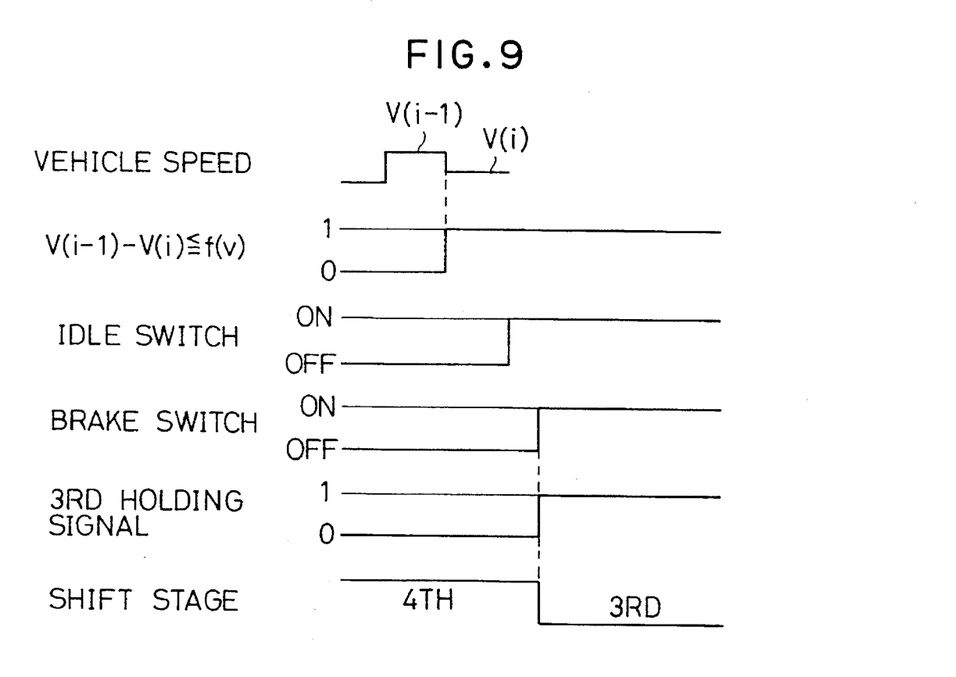
FIG. 9 is a time chart showing a shift operation when the driver operates a brake pedal.

Referring to FIG. 9, in accordance with another embodiment of the present invention, when the throttle valve opening is fully closed at the fourth shift gear stage by a driver under the condition that the vehicle speed is less than 75km/h and the vehicle is running down on a slope, the second AND gate 32 of the automatic engine braking circuit 30 outputs "1". In this embodiment of the present invention, when the difference between the vehicle speed V(i−1) at the previous time and the vehicle speed V(i) at the present time is less than the predetermined value f(V) or when the negative acceleration of the vehicle on the slope is small, and the driver operates the brake pedal and then the brake switch is turned on, the fourth AND gate 34 of the automatic engine braking circuit 30 outputs "1" and then the Q terminal of the holding circuit 36 outputs "1" or the third shift gear stage holding signal so that the automatic transmission 2 is downshifted from the fourth shift gear stage to the third shift gear stage. That is, the downshift operation from the fourth shift gear stage to the third shift gear stage is carried out only when the throttle valve opening is fully closed and the driver operates the brake pedal so as to reduce the vehicle speed much more on the down slope. As a result, the effective downshift control operation can be carried out when the driver wants to reduce the vehicle speed on the down slope. Further, since the downshift operation is not carried out in all situations by the automatic engine braking function when the throttle valve opening is fully closed, the number of the shifting operation can be limited effectively.

Referring back to FIGS. 4 and 5, on the contrary, when the driver operates the accelerator pedal after the driving condition moves into the extended zone of the third shift gear stage of the 3–4 upshift line, the driving condition moves into another zone where the vehicle can not run at a low speed at the third shift gear stage. Under this situation, in accordance with another embodiment of the present invention, since the first AND gate 42 in the release determining circuit 40 does not output the releasing signal based on the inverting signal of the zone indicated by the numeral 3, the third shift gear stage is held. As a result, uncomfortable feelings caused by the upshift operation to the fourth speed stage can be prevented under this situation.

Further, when the driving condition moves into the 2nd zone and then the reduced amount of the pseudo throttle valve opening TVO' becomes greater, a predetermined small value Y or the TVO' becomes stable, the third AND gate 45 outputs "1" and then the first AND gate 42 outputs the release signal. Thereafter the fourth AND gate 48 outputs the fourth speed stage upshift signal. As a result, since the shift gear stage is upshifted from the third shift gear stage to the fourth shift gear stage after the throttle valve opening becomes stable, the driver does not feel uncomfortableness caused by the shift operation immediately after the driver operates the accelerator pedal.

Figure 10:
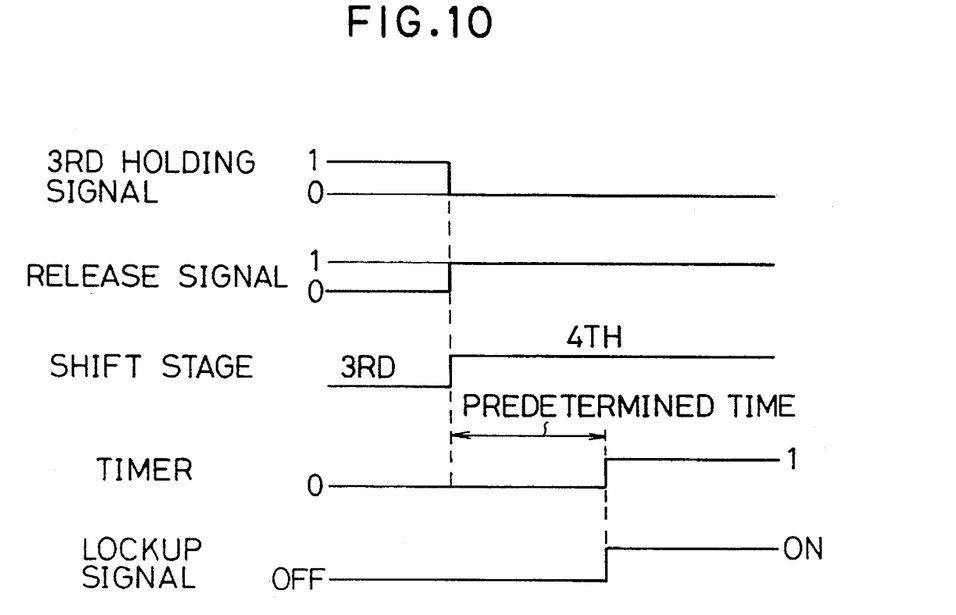
FIG. 10 is a time chart showing a shift operation and a lockup operation when the driving condition goes into a lockup control zone.

Referring to FIG. 10, when the driving condition moves into the lockup driving zone in FIG. 2, the upshift operation to the fourth shift gear stage is carried out after the throttle valve opening becomes stable as described above. In accordance with another embodiment of the present invention, the timer 50 outputs "1" when the upshift operation is carried out and then a predetermined time has passed. At this moment, the fifth AND gate 49 outputs the lockup signal so as to engage the lockup clutch 3a. As a result, since the lockup clutch 3a is engaged when the shift operation to the fourth shift gear stage is carried out and then the predetermined time has passed, shift shocks can be prevented effectively.

Referring back to FIGS. 4 and 5, in accordance with another embodiment of the present invention, when the driving condition moves into the 1st driving zone, the third AND gate 45 outputs "1", the first AND gate 42 outputs the release signal, and the fourth AND gate 48 does not output the fourth shift gear stage upshift signal. As a result, the shift stage is held at the third shift gear stage, and therefore good acceleration ability can be obtained. Further, when the driving condition goes across the 3–4 upshift line thereafter, the shift stage is upshifted to the fourth shift gear stage based on the basic shift line in FIG. 2, the driver does not feel uncomfortableness caused by the upshift operation.

Moreover, since the boundary between the 2nd driving zone and the 3rd driving zone is the 3–4 upshift line, both driving zones can be divided by the engine load (throttle valve opening) and the vehicle speed. Therefore, the shift operation can be carried out based on the respective driving condition.

What is claimed is:

1. A control system for an automatic transmission, comprising:

shift means for shifting respective shift gear stages;

a shift line map including upshift lines and downshift lines;

shift timing detecting means for detecting a shift timing at which a shift operation should be carried out based on an engine load on the shift line map and an estimated possibility that a driving condition will return back to a previous shift gear stage;

engine load detecting means for detecting an engine load and a stable condition of the engine load;

control means for controlling the shift means based on the shift line map after the engine load detecting means detects the stable condition of the engine load at the shift timing detected by the shift timing detecting means;

said shift line map being provided with an extended zone extended to a higher vehicle speed side in a lower shift gear stage near no engine load, said shift timing detecting means detecting the shift timing when the driving condition crosses the extended zone based on a change in the engine load, said shift line map including divided driving zones, different from the upshift and downshift lines;

means for detecting a driving condition moving from the extended zone to another zone, except the extended zone, on the shift line map; and second control means for switching a shift operation based on the upshift and downshift lines to a shift operation based on the driving zones and holding the lower shift gear stage when the driving condition is detected by the driving condition detecting means.

2. A control system for an automatic transmission as recited in claim 1 wherein said driving zones include a third driving zone in which a vehicle runs at a constant speed at the lower shift gear stage, and said second control means maintains the lower shift gear stage in the third driving zone.

3. A control system for an automatic transmission as recited in claim 1 wherein said driving zones include a second driving zone enclosed by a first predetermined engine load and a second predetermined engine load larger than the first engine load, and said second control means releases holding of the lower shift gear stage after the driving condition goes into the second driving zone when the engine load is stable.

4. A control system for an automatic transmission as recited in claim 3 wherein said driving zones include a first driving zone in which the engine load is greater than the second predetermined engine load, and said second control means releases holding of the lower shift gear stage immediately after the driving condition goes into the first driving zone.

5. A control system for an automatic transmission as recited in claim 4 wherein said first and second driving zones are provided along an upshift line in the shift line map.

6. A control system for an automatic transmission as recited in claim 1 wherein said automatic transmission comprises a torque converter and a lockup clutch directly connecting input and output shafts of the torque converter, said shift line map includes a lockup zone where the lockup clutch is engaged, and said second control means engages the lockup clutch when a predetermined time has passed after the shift operation is carried out in the lockup zone.

7. A control system for an automatic transmission, comprising:

shift means for shifting respective shift gear stages;

a shift line map including upshift lines and downshift lines;

shift timing detecting means for detecting a shift timing at which a shift operation should be carried out based on an engine load on the shift line map and an estimated possibility that a driving condition will return back to a previous shift gear stage;

engine load detecting means for detecting an engine load and a stable condition of the engine load; and control means for controlling the shift means based on the shift line map after the engine load detecting means detects the stable condition of the engine load at the shift timing detected by the shift timing detecting means;

said engine load detecting means detecting the stable condition of the engine load by employing a pseudo engine load signal which is changed when a difference between an actual engine load signal and a slow rate engine load signal, which has a same value as the actual engine load signal when the engine and load is in the stable condition and has a greater value and a smaller absolute value of rate of change therein than the actual engine load when the engine load is decreasing, and thereafter becomes same as the actual engine load, becomes less than a predetermined value, said control means controlling the shift means based on the pseudo engine load signal.

8. A control system for an automatic transmission as recited in claim 7 wherein said shift line map is provided with an extended zone extended to a higher vehicle speed side in a lower shift gear stage near no engine load, said shift timing detecting means detects the shift timing when the driving condition crosses the extended zone based on a change in the engine load, and said control means controls the shift means so that a lower shift gear stage is held by an input of a no load signal from an engine only when the difference between the actual engine load signal and the slow rate engine load signal becomes greater than a predetermined value.

9. A control system for an automatic transmission, comprising:

shift means for shifting respective shift gear stages;

a shift line map including upshift lines and downshift lines;

shift timing detecting means for detecting a shift timing at which a shift operation should be carried out based on an engine load on the shift line map and an estimated possibility that a driving condition will return back to a previous shift gear stage;

engine load detecting means for detecting a stable condition of the engine load; and control means for controlling the shift means based on the shift line map after the engine load detecting means detects the stable condition of the engine load at the shift timing detected by the shift timing detecting means and for controlling the shift means so that a lower shift gear stage is held when a no load signal from an engine is input thereto.

10. A control system for an automatic transmission as recited in claim 9 wherein said control means controls the shift, means so that the lower shift gear stage is held when a no load signal of the engine is input thereto.

11. A control system for an automatic transmission as recited in claim 9 wherein said control means controls the shift means so that the lower shift gear stage is held only when a brake is operated.

12. A control system for an automatic transmission, comprising:

shift means for shifting respective shift gear stages;

a shift line map including upshift lines and downshift lines;

shift timing detecting means for detecting a shift timing at which a shift operation should be carried out based on an engine load on the shift line map and an estimated possibility that a driving condition will return back to a previous shift gear stage;

engine load detecting means for detecting an engine load and a stable condition of the engine load; and control means for controlling the shift means based on the shift line map after the engine load detecting means detects the stable condition of the engine load at the shift timing detected by the shift timing detecting means;

said shift line map being provided with an extended zone extended to a higher vehicle speed side in a lower shift gear stage near no engine load, said shift timing detecting means detecting the shift timing when the driving condition crosses the extended zone based on a change in the engine load, said control means controlling the shift means so that a lower shift gear stage is held by an input of a no load signal of an engine only when a negative acceleration of the vehicle is less than a predetermined value.

* * * * *